United States Patent
Kroon et al.

(10) Patent No.: US 9,888,700 B2
(45) Date of Patent: Feb. 13, 2018

(54) PROCESS FOR THE PREPARATION OF STRUCTURED OIL PHASE

(71) Applicant: CONOPCO, INC., Englewood Cliffs, NJ (US)

(72) Inventors: Cornelis Johannes Kroon, Pijnacker (NL); Ronald Peter Potman, Papendrecht (NL); Irene Erica Smit-Kingma, Voorburg (NL)

(73) Assignee: Unilever BCS US, Inc., Englewood Cliffs, NJ (US)

( * ) Notice: Subject to any disclaimer, the term of this patent is extended or adjusted under 35 U.S.C. 154(b) by 275 days.

(21) Appl. No.: 14/432,862

(22) PCT Filed: Sep. 24, 2013

(86) PCT No.: PCT/EP2013/069850
§ 371 (c)(1),
(2) Date: Apr. 1, 2015

(87) PCT Pub. No.: WO2014/056720
PCT Pub. Date: Apr. 17, 2014

(65) Prior Publication Data
US 2015/0296826 A1  Oct. 22, 2015

(30) Foreign Application Priority Data
Oct. 8, 2012  (EP) .................................... 12187628

(51) Int. Cl.
*A23D 7/04* (2006.01)
*A23D 7/00* (2006.01)
*A23D 7/005* (2006.01)
*A23D 7/01* (2006.01)

(52) U.S. Cl.
CPC ............... *A23D 7/04* (2013.01); *A23D 7/001* (2013.01); *A23D 7/003* (2013.01); *A23D 7/0056* (2013.01); *A23D 7/013* (2013.01)

(58) Field of Classification Search
CPC ...... A23D 7/0056; A23D 7/013; A23D 7/001; A23D 7/003; A23D 7/04
USPC ......................................................... 426/602
See application file for complete search history.

(56) References Cited

FOREIGN PATENT DOCUMENTS

| EP | 0185631 | 5/1986 | |
|---|---|---|---|
| EP | 1651338 | 5/2011 | |
| EP | 2367439 | 9/2011 | |
| EP | 1865786 | 11/2011 | |
| GB | 1252264 | 11/1971 | |
| RU | 2129384 C1 * | 4/1999 | ............ A23C 15/00 |
| WO | WO2010069751 | 6/2010 | |
| WO | WO2010069753 | 6/2010 | |

OTHER PUBLICATIONS

Brusentsev et al. RU 2129384 C1 Derwent abstract, Apr. 27, 1999.*
P. Munuklu, Particle formation of edible fats using the supercritical melt micronization process (ScMM), The Journal of Supercritical Fluids, 2007, pp. 181-190, 43.
Search Report in EP12187628, dated Mar. 8, 2013.
Search Report in PCTEP2013069850, dated Jan. 2, 2014.
Written Opinion in EP12187628, dated Mar. 8, 2013.
Written Opinion in PCTEP2013069850, dated Jan. 2, 2014.

* cited by examiner

*Primary Examiner* — Emily Le
*Assistant Examiner* — Subbalakshmi Prakash
(74) *Attorney, Agent, or Firm* — Gerard J. McGowan, Jr.

(57) ABSTRACT

Process for manufacturing a spreadable edible emulsion, the emulsion comprising oil, water and a micronized fat powder, wherein during processing the oil with the fat powder with a minor amount of water is stored for a period of from 8 hours to 7 days prior to further processing.

10 Claims, No Drawings

PROCESS FOR THE PREPARATION OF STRUCTURED OIL PHASE

The present invention relates to a process for the preparation of a mixture of a structured fat phase and some water, and to the use of such in the manufacture of a spreadable edible emulsion comprising fat and a structuring agent, in particular to such mixtures comprising fat and a structuring agent as continuous phase and a dispersed phase. In such, the dispersed phase may be an aqueous liquid (thus forming a water-in-oil emulsion). Next to that, the present invention relates to the use of the mixture of the structured oil phase with some water so prepared as a semi-finished product which may be stored for some time and/or to be transported.

BACKGROUND OF THE INVENTION

Edible emulsions comprising oil and a structuring agent are well known. Examples of such products that substantially consist of such edible dispersions are water-in-oil emulsions, such as for instance margarines and spreads. Such products typically have a fat phase comprising a liquid (at 20° C.) oil phase and a solid (at 20° C.) fat phase. This solid fat is often also designated as hardstock, and if processed correctly can provide structure to the oil and stabilization of the dispersion.

Such hardstock and the way it provides structure and/or stabilization can be prepared in a number of ways. For example EP 1651338 and other patent publications describe the manufacture of micronised fat particles that can be used to structure a fat phase for dispersions. EP 1651338 also describes how such structured fat phase can be used to make a spreadable edible dispersion comprising a dispersed aqueous phase. Such process usually comprises the steps of:
preparing the micronised fat particles,
providing an oil phase (usually oil+oil-soluble components, but it can be oil on its own),
formation of a fat crystal network in the oil phase involving mixing said micronised fat particles with said oil phase to form a structured oil phase,
providing an aqueous phase,
mixing said aqueous phase with the structured oil phase to provide a dispersion of an aqueous phase in a structured oil phase.

EP 1865786 discloses a process for manufacturing a spreadable emulsion in which the aqueous phase is added gradually to the structured oil phase. Gradually adding is defined as in two or more different portions at different times during the process (if conducted batchwise) or in two or more places in the process equipment in a continuous process.

In the above process, it was found, the mixing in of the aqueous phase with the structured oil phase should occur not too long after formation of the structured oil phase. This is an issue to take into account, as the various steps are carried out batchwise, and the micronised particles themselves are very bulky and difficult to handle, hence the earlier it is blended with the oil phase the more convenient. Depending on exact process conditions, amounts of various components etceterea, it was found that if there is more than about 8 hours between these two steps, the resulting product (the water in oil dispersion as the spreadable product) becomes too soft initially. Too soft in this connection means that it falls short in the desired Stevens value, and in practice means that the product is not appreciated by consumers (resulting in an appearance more like a skin cream or mayonnaise rather than a spread reminiscent of butter). Such softness can be partly overcome by storing the too soft product in cooled warehouses for periods of several weeks (e.g. more than 5 weeks). Ongoing crystallization of hard fats then ensures an increase in Stevens value, which is a measure of hardness of a plastic product. Needless to say such storage is unattractive on a commercial scale. That said, a short storage time (up to 2-3 weeks) of manufactured edible dispersions of the type of this invention are common in the industry, and factures are designed for such.

EP 2367439 (WO2010069751) discloses a process for the preparation of an edible fat continuous food product. The process involves preparing a fat mixture comprising a fat powder and liquid oil, followed by mixing with the aqueous phase followed by filling in tubs. The exemplified product, once finalized, is stored for one week before being analysed on quality and spreadability.

WO 2010/069753 discloses a process for the preparation of a fat-continuous spread, the fat phase comprising a fat powder.

GB 1252264 discloses a process for manufacturing a spread comprising 70-90% fat.

SUMMARY OF THE INVENTION

Hence, there is a need for a process for manufacturing a spreadable edible emulsion comprising oil and a structuring agent, in particular to such emulsions comprising oil and a structuring agent as continuous phase and a dispersed aqueous phase, in which the oil containing the structuring agent can be stored for a period of more than 8 hours, whilst the resulting product does not need 4 weeks storage time or more for an acceptable hardness as expressed by a Stevens value.

It has now been found that such can be achieved, at least in part, by a process for the preparation of a spreadable edible emulsion comprising 15-80% fat slurry and 20-85% of an aqueous phase, both weight % on the total emulsion, the fat slurry comprising 3-25% of a micronised fat powder and 75-97% of a fat not in powdered form, both weight % on the total fat phase, the process comprising the steps of:
a. providing a micronised fat powder,
b. providing a fat not in powdered form,
c. mixing the micronised fat powder with the fat not in powdered form to form a fat slurry, such that the slurry contains 3-25 wt % micronised fat powder based on the total amount of fat slurry,
d. adding an aqueous phase to the fat slurry to produce a mixture, in such an amount that the slurry contains up to half of the desired amount of aqueous phase of the final spreadable emulsion,
e. storing the so-obtained fat-water mixture for a period of from 8 hours to 7 days,
f. adding the remainder of the aqueous phase to the stored mixture,
g. processing such into a spreadable edible emulsion.

In the above process, for a good effect it is preferred that the amount of aqueous phase which is added in step d. is from 3 to 15%, preferably from 5 to 12% by weight on the total slurry weight.

The above describes a process for manufacturing products like e.g. spreads. The fat phase produced by step c. is preferably carried out such that a structured oil phase is obtained, such as e.g. known in the prior art cited. Such products can be finished products. The present invention can also be used to manufacture a semi-finished products, in that a structured oil phase is manufactured, which is sufficiently stable to be stored for some time or even to be transported.

Storage can be advantageous when the line has to be closed down for failure, cleaning, or other reason. Being able to transport the structured oil phase can be advantageous e.g. when manufacturing the micronised fat powder occurs in one location, whereas the manufacturing into a final product (involving the mixing with substantial amounts of water and optionally other components occurs in a different location. Structured oil phases so far produced could not be stored or transported for considerable time for reasons stated, whereas the current invention does allow such.

As the current invention also allows for semi-finished products to be manufactured that comprise a structured fat phase, which semi-finished products can be utilized for manufacture of spreads but also other goods, such as e.g. confectionary or chocolate, the present invention further relates to a process for the preparation of an edible mixture comprising at least 85% of fat and 1 to 15% of an aqueous phase, both weight % based on the total weight of the mixture, the fat comprising 3-25% of a micronised fat powder and 75-97% of a fat not in powdered form, both weight % on the total fat phase, the process comprising the steps of:
 a. providing a micronised fat powder,
 b. providing a fat not in powdered form,
 c. mixing the micronised fat powder with the fat not in powdered form to form a fat slurry, such that the fat slurry contains 3-25% micronised fat powder based on the total amount of fat slurry,
 d. adding the aqueous phase to the fat slurry to produce a mixture,
 e. storing the so-obtained fat-water mixture for a period of from 8 hours to 7 days.

In the present invention, the fat phase containing the oil and the micronised fat particles is preferably processes such that it is a structured oil phase. Such processing is known in the art.

DETAILED DESCRIPTION

"Micronised fat powder" is herein to be understood as a particulate matter comprising at least 80% by weight of fat, which particulate matter is solid at 20° C., which micronised fat powder is obtainable by a super critical melt micronisation process, as described in J. of Supercritical Fluids 43 (2007) 181-190 and EP 1651338.

"Fat" is herein to be understood as one or more lipids, at least 80% by weight composed of fatty acid triglycerides. Preferably said fat comprises at least 80% by weight of vegetable fat. Fat herein includes oil.

"Fat not in powdered form" is herein to be understood as Fat, but other than in powdered form (including other than micronised fat powder). Preferably such fat not in powdered form is fat liquid at 20° C. (i.e. commonly understood as an oil).

In essence the two processes as set out above are the same, except that the first process contains two additional steps, in that a second amount of a water phase is added, and the product is processed into an emulsion, preferably such as a spread. Regarding the first, the second water phase (in step f) may be of the same as the first (in step d) or of a different aqueous composition. Either of such has its own advantages. Regarding the processing into a spread, such is well known in the art, e.g. by utilizing a so-called pin-stirrer.

In the processes of the present invention, it is preferred that the micronised fat powder utilized herein has a composition such that it is solid at 20° C. It is furthermore preferred that such micronised fat powder is manufactured by a process involving super critical melt micronisation process, and more preferably such as described in J. of Supercritical Fluids 43 (2007) 181-190 and EP1651338.

As to the amount of micronised fat powder used in the processes according to the present invention such is not different from processes as known in the art that structure oil with micronised fat powder. Hence, the amount of the micronised fat powder on the total fat phase is preferably from 5 to 20%, and more preferably from 7 to 15% by weight on the fat phase. In the processes according to the present invention it is preferred that the slurry is a structured fat.

In the processes according to the present invention, without wishing to be bound by theory, it was found that the addition of a small amount of water allows a structured fat (e.g. an oil structured by micronised fat particles) to be stored, without disadvantageous effects on products such as spreads produced therefrom subsequently. Such storing in step e. is preferably from 18 hours to 3 days, and more preferably from 24 hours to 2 days.

The temperature of the mixture containing a slurry of fat and micronised fat powder (e.g. a structured oil phase) and which now contains some water is preferably stored in the processes according to the present invention at a temperature below the melting point of that of the micronised fat particles. More preferably, such is at a temperature of from 0 to 20° C., even more preferably from 4 to 10° C. During such storage step e. in the processes according to the present invention the dispersion that is stored is preferably kept in motion. Such can be carried out by conventional means, e.g. high speed impellers and/or anchor-stirrers.

In the present invention, it is preferred that the fat not in powdered form is fat liquid at 20° C. Such is commonly understood as to be an oil. Preferred fats herein are vegetable fat. Hence, for the fat not in powdered form it is preferred that such is liquid at 20° C., e.g. an oil. Preferably the fat not in powdered form is a vegetable fat, e.g. a vegetable oil. In the present invention, the fat preferably comprises (more preferably for at least 50% of the fat) sunflower oil, rape seed oil, corn oil, palm kernel oil, coconut oil.

EXAMPLES

Spreads Product Composition

Edible spreads with a composition as in Table 1 were made according to the methods as described below.

TABLE 1

| Spreads product formulation (wt. %). | |
|---|---|
| | wt % on batch |
| Fat phase (fat slurry) composition | |
| inES48 powder | 10 |
| RP | 78.68 |
| PK | 10 |
| Dimodan RT/B | 1.07 |
| Colourant | 0.25 |
| Total | 100 |
| Water phase composition | |
| Demi-water (incl. acidifier) | 99 |
| Salt | 0.83 |
| Potassium sorbate | 0.17 |
| Total | 100 |

The water phase was acidified to pH of 4.8 using 20% citric acid solution. inES48 is an interesterified mixture of 65% dry fractionated palm oil stearin with an Iodine Value of 14 and 35% palm kernel oil. For examples 1 to 4 a micronised fat powder of inES48 was used that was obtained using a supercritical melt micronisation process, as described in J. of Supercritical Fluids 43 (2007) 181-190 and EP1651338.

PK is palm kernel oil.
RP is rape seed oil.
Dimodan RT/B is a molecularly distilled mono/diacylglyceride mixture derived from fully hardened palm oil (90% monoglyceride) ex Danisco.

Preparation of Spreads According to the Invention
(Example 1-4)

Preparation of fat phase (=slurry).

Cold oil and colorant are added to a stirring tank, mixed, and degassed. A stock solution of the emulsifier also comprising the liquid hardstock was prepared by mixing the emulsifier and the liquid hardstock with about 1% of the oil and heating it up to 75 degrees Celsius. The stock solution, cooled to about 70 degrees Celsius, was added to the degassed oil, with a temperature of about 14 degrees Celsius, and mixed. The temperature of the oil mixed with the stock solution will be about 18 degrees Celsius. Next, the inES48 micronised fat powder was added to the oil and mixed-in under vacuum. The micronised fat powder and oil mixture is mixed under high shear, using a reflux pipe until a slurry was obtained which appeared smooth and translucent. The maximum temperature increase observed due to mixing was about 21.5 degrees Celsius. Before being fed into the C-unit see below the temperature of the oil-slurry was about 20 degrees Celsius. The so-obtained slurry (fat phase) was transported to the fat run tank.

Preparation of the Water Phase

The water phase was prepared by dissolving the sodium chloride in the water and adjusting the pH to about 4.8 using 20 wt. % citric acid solution. Before being fed into the C-unit, see below, the water-phase was cooled to about 12-13 degrees Celsius.

Example 1

A part of the fat slurry and water phase as prepared above was used to produce a fat continuous spread containing 45% fat, shortly after production (time=t0). This was done by feeding the fat phase and water phase to a C-unit (volume 75 ml) operating at a flow-rate of 15 kg per hour and at 2400 rpm. Tubs were filled and stored at 5 degrees Celsius for a period of up to 5 weeks.

Example 2-4

The remainder of the fat slurry was divided into 3 portions. Demi water was added to two of the three portions of fat slurry and mixed in to form mixtures which contain 5% (158 gr water in 2998 gr fat/water mixture, example 3) and 10% demi water (401 gr water in 3612 gr fat/water mixture, example 4).

The third portion of fat slurry (for example 2) was kept in the fat run tank.

Both the two mixtures of examples 3 and 4 containing fat slurry and demi water as well as the fat slurry without demi-water (example 2) (and also the water phase separately) were agitated and kept at 15° C. for about 20 hours (time=t1).

After this period the mixtures of examples 3 and 4 and the slurry of example 2 were used to make spreads using the same equipment, water phase and settings as was used for example 1 the day before.

As the fat phase was dosed in all 4 spreads at 45%, the final products consist of the ingredients and levels as in table 2.

TABLE 2

Spreads product formulation (wt. %).

| Ingredient | wt % on total composition |
| --- | --- |
| inES48 powder | 4.5 |
| RP | 35.36 |
| PK | 4.5 |
| Dimodan RT/B | 0.48 |
| Colourant | 0.11 |
| Demi-water | 54.5 |
| Salt | 0.46 |
| Potassium sorbate | 0.09 |

Results

Spreads produced according to the processes and compositions described above were analyzed on Stevens value. Stevens values give an indication about the hardness (also called firmness) of a product. The Stevens value is determined according to the following protocol.

Products were stabilized at 5 degrees Celsius. The hardness of the product is measured with a Stevens penetrometer (Brookfield LFRA Texture Analyser (LFRA 1500), ex Brookfield Engineering Labs, UK) equipped with a stainless steel probe with a diameter of 6.35 mm and operated in "normal" mode. The probe was pushed into the product at a speed of 2 mm/s, a trigger force of 5 gram from a distance of 10 mm. The force required was read from the digital display and is expressed in grams.

The results for the examples 1-4 are set out in table 3, and graphically in figure 1.

TABLE 3 results Stevens value measurements.

| Example | Stevens value, 2 weeks at 5° C. | Stevens value, 3 weeks at 5° C. | Stevens value, 5 weeks at 5° C. |
| --- | --- | --- | --- |
| 1 (no water, no storage) | 176 | 184 | 170 |
| 2 (no water, 20 h storage) | 150 | 160 | 163 |
| 3 (5% water, 20 h storage) | 144 | 175 | 162 |
| 4 (10% water, 20 h storage) | 144 | 182 | 170 |

Firmness development in the spreads during storage at 5° C. shows a remarkable trend. After the initial lowering of the firmness due to slurry aging, the firmness of the spreads made with aged slurry recovers again during 5° C. storage. The recovery of the firmness is faster for samples where water was added to the slurry.

CONCLUSION

Addition of a small amount of water allows a fat slurry comprising oil and a micronised fat powder as structuring agent to be stored, without detrimental effects in the end on firmness as expressed as Stevens value of a spread prepared from such slurry.

The invention claimed is:

1. A process for the preparation of a spreadable edible emulsion comprising 15-80% fat slurry by weight and 20-85% of an aqueous phase by weight, the fat slurry comprising 3-25% of a micronised fat powder by weight and 75-97% by weight of a fat not in powdered form, the process comprising the steps of:
   a. providing a micronised fat powder,
   b. providing a fat not in powdered form,
   c. mixing the micronized fat powder with the fat not in powdered form to form a fat slurry, such that the slurry contains 3-25 wt. % micronised fat powder based on the total amount of fat slurry,
   d. adding an aqueous phase to the fat slurry to produce a mixture, in such an amount that the slurry contains up to half of the desired amount of aqueous phase of the final spreadable emulsion,
   e. storing the mixture from step (d) for a period of from 8 hours to 7 days,
   f. adding the remainder of the aqueous phase to the stored mixture,
   g. processing the combined aqueous phase and stored mixture from step (f) into a spreadable edible emulsion.

2. Process according to claim 1, wherein amount of the aqueous phase added is from 3 to 15% by weight, based on weight of the mixture made in step (d).

3. Process according to claim 1, wherein the fat not in powdered form is fat liquid at 20° C.

4. Process according to claim 1, wherein amount of the micronised fat powder is from 5 to 20% by weight of the fat slurry.

5. Process according to claim 1, wherein the micronised fat powder is obtained by a super critical melt micronisation process.

6. Process according to claim 1, wherein the storing in step e. is from 18 hours to 3 days.

7. Process according to claim 1, wherein the storage is at a temperature of from 0 to 20° C.

8. Process according to claim 1, wherein during the storing step e. the product is kept in motion.

9. Process according to claim 1, wherein the slurry is a structured fat.

10. Process according to claim 1, wherein the oil is a vegetable oil.

* * * * *